Oct. 27, 1959    J. E. HODGSON    2,910,206
REFUSE CAN WITH FOOT PEDAL CLOSURE OPENING MEANS
Filed Jan. 23, 1957    2 Sheets-Sheet 2
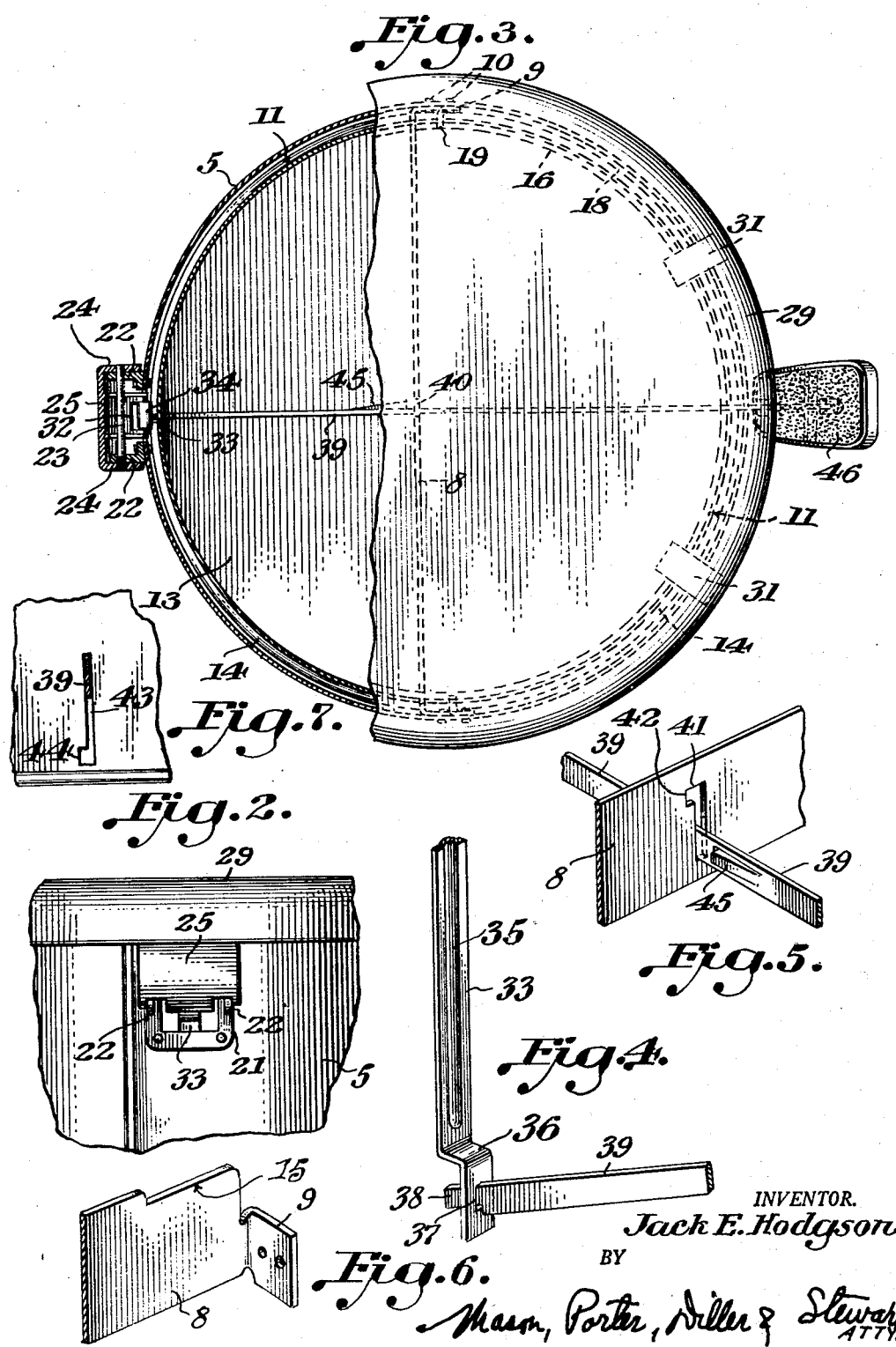
INVENTOR.
Jack E. Hodgson,
BY
Mason, Porter, Diller & Stewart
ATTYS United States Patent Office 2,910,206
Patented Oct. 27, 1959

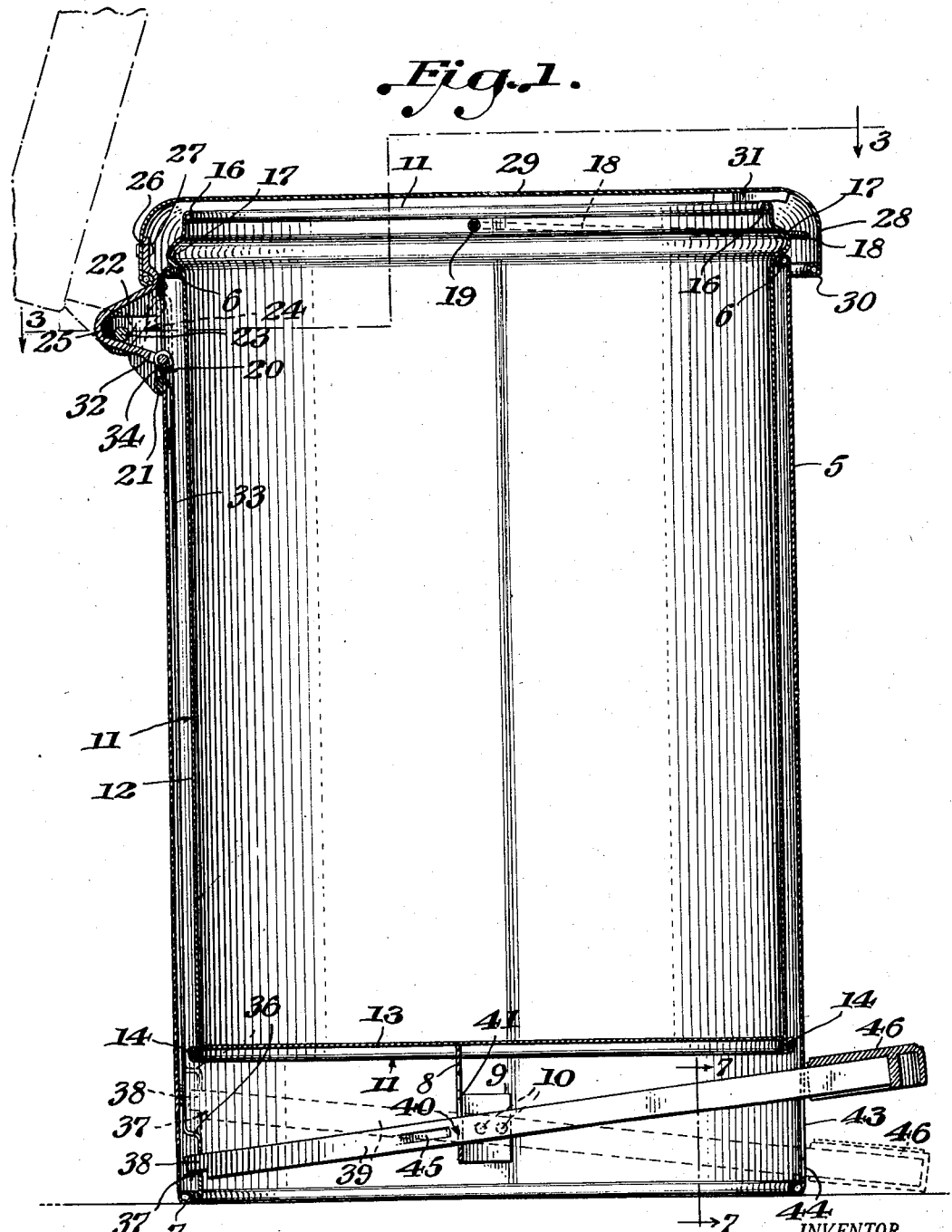

2,910,206

REFUSE CAN WITH FOOT PEDAL CLOSURE OPENING MEANS

Jack E. Hodgson, Baltimore, Md., assignor to Continental Can Company, Inc., New York, N.Y., a corporation of New York Application January 23, 1957, Serial No. 635,856

5 Claims. (Cl. 220—17)

The invention relates generally to metallic receptacles and primarily seeks to provide a novel and attractive receptacle in which to receive refuse, the same including an outer shell having a hinged cover, and an inner container removably supported within the shell, there being included novel "step-on" pedal operated means for lifting the cover in order to facilitate the depositing of refuse and the removal of the inner container.

An object of the invention is to provide a receptacle structure of the character stated wherein the cover hinge includes a crank portion extending into the interior of the outer shell where it is connected with an upright thrust bar which extends downwardly in a space between the shell and the inner container, there being included a support bar secured to and traversing the shell in position to support the bottom of the inner container, and a pedal bar fulcrumed on the support bar and connected at one end to the lower end of the thrust bar and projecting at its other end through a narrow upright slot in the shell to a position exteriorly of the shell where it carries a foot engageable depresser pedal.

Another object of the invention is to provide a receptacle structure of the character stated wherein the shell and inner container have cooperating bead and edge curl engagement effective to center the container within the shell and provide a free space in which the thrust bar is operable, hidden from view from the exterior of the structure.

Another object of the invention is to provide a receptacle of the character stated wherein the inner container has a bottom seam-secured thereon so that the bottom closure is recessed upwardly from the bottom extremity of the container body, and wherein the support bar has end clearances to receive the bottom seam so that the top edge of the bar directly engages the bottom closure.

Another object of the invention is to provide a receptacle of the character stated wherein the pedal bar merely rests as a fulcrum at the lower extremity of an upright slot in the support bar, the inner end of the pedal bar extending through and engaging in an upright slot in an inward offset provided at the lower end of the thrust bar, and the other end of the pedal bar projecting through an upright slot in the shell to carry the foot engageable pedal externally of the shell, there being included means for securing the pedal bar against free sliding movement outwardly through said slots.

A further object of the invention is to provide a receptacle of the character stated wherein means for removably securing the pedal bar in place comprises a lug struck out from the pedal bar and engageable behind the support bar, and lateral enlargements in the support bar and shell slots through which said lug can be withdrawn after being moved into registry with the enlargements.

A still further object of the invention is to provide a receptacle of the character stated wherein the cover hinge includes a wall portion extending over and concealing the crank extension receiving opening in the shell.

With the above and other objects in view that will hereinafter appear, the nature of the invention will be more clearly understood by reference to the following detailed description, the appended claims and the several views illustrated in the accompanying drawings.

In the drawings:

Figure 1 is a vertical cross section illustrating the improved can structure, the depressed position of the cover lift pedal being shown in dotted lines.

Figure 2 is a fragmentary side elevation looking at the exterior of the cover hinge means.

Figure 3 is a horizontal section taken on the line 3—3 on Figure 1.

Figure 4 is a fragmentary perspective view illustrating the lower end portion of the thrust bar and the cooperating end portion of the pedal bar.

Figure 5 is a fragmentary perspective view illustrating the central portion of the support bar and the manner of mounting and removing the pedal bar through the fulcrum slot therein.

Figure 6 is a fragmentary perspective view illustrating the mounting at one end of the support bar.

Figure 7 is a fragmentary vertical cross section taken on the line 7—7 on Figure 1.

In the example of embodiment of the invention herein disclosed, the improved "step-on" refuse receptacle includes an outer cylindrical shell 5 having an inwardly turned reinforcing curl 6 at its upper end and a similar curl 7 at its lower end. A support bar 8 traverses the shell near the lower end thereof, the same having angled bracket portions 9 which are riveted or otherwise secured at 10 to the shell. The bar 8 is adapted to support an inner removable container generally designated 11 and having a cylindrical body 12 with a bottom 13 seam-secured thereon at 14. The support bar 8 may have end clearances 15 to permit the bottom 13 to rest directly thereon. See Figures 1 and 6.

An inwardly turned reinforcing curl 16 is provided at the top end of the body 12, and an outwardly directed strengthening bead 17 is provided just below said curl. A carrying bail or handle 18 also is provided, the same being pivotally mounted on the container immediately above the bead 17.

The outer shell 5 has a rectangular opening 20 near the upper end thereof and this opening is framed by a rectangular member 21 having ears 22 projecting therefrom in which a pivot shaft 23 is rockably mounted. The shaft 23 is fixed in ears 24 projecting from a hinge plate 25, the latter having a bracket extension 26 which is riveted or otherwise secured at 27 to the flange or skirt 28 of a cover 29. The cover flange has an inturned reinforcing curl 30 at its lower edge extremity, and bumper stops 31 of rubber or like yieldable material are provided and are disposed as indicated in Figure 1 to be engageable with the upper end curl 16 of the inner container 11. The hinge plate 25 carries a crank 32 which extends inwardly through the opening in the hinge member 21. The inwardly projected end of the crank extension 32 is connected to the upper end of an uprightly disposed thrust bar 33, being pivotally connected thereto at 34. See Figure 1. The thrust bar 33 has a reinforcing rib 35 extending throughout the major portion of the length thereof, and said bar is inwardly offset at 36 at the lower end portion thereof below the level of the top edge of the support bar 8 and the bottom seam 14 on the inner container 11. An upright slot 37 is provided near the lower end extremity of the thrust bar 33, as indicated in Figures 1 and 4.

The stepped end portion 38 of a pedal bar 39 is projected through the thrust bar slot 37 and the bar 39 is fulcrumed at 40 in a vertical slot 41 provided in the support bar 8, said slot having an offset or lateral enlargement 42 at its upper end extremity as illustrated in Figure 5. At its other end the pedal bar 39 projects through a vertical slot 43 provided in the lower wall portion of the shell 5, and this slot also has an offset or lateral enlargement 44 as indicated in Figure 7. It will be noted that whereas the lateral offset or enlargement 42 in the support bar slot 41 is located at the upper extremity of the slot, the lateral offset or enlargement 44 of the shell slot 43 is provided at the lower end extremity of the slot. It will be apparent that while the pedal bar 39 is freely slidable in the slots 37, 41 and 43, it is secured against removal by engagement of the lug 45 behind the support bar 8 in the manner illustrated in Figure 1. The lug 45 is a spring lug and is struck out from the pedal bar 39 in the manner clearly illustrated in Figure 5. At the end portion thereof extending through the shell slot 43 and exteriorly of the shell, the pedal bar 39 carries a foot engageable pedal or enlargement 46.

With the parts mounted as illustrated in Figure 1, it will be apparent that by stepping on and depressing the pedal 46 the pedal bar 39 will be rocked downwardly about its fulcrum mounting on the support bar 8 to the dotted line position illustrated in Figure 1. This will cause the stepped end extremity 38 to push upwardly on the thrust bar 33 and cause the same to swing the crank extension 32 upwardly about the axis of the shaft 23, thereby to lift the cover 29 or swing the same to the open position which will permit the depositing of refuse into the inner container 11, or free removal of said container from the outer shell 5.

It will be apparent that the engagement of the inner container bead 17 on the upper shell curl 6 will serve to center the inner container within the outer shell with the container and shell walls in annular spaced relation, thereby to provide a space in which the thrust bar 33 can operate, out of view from the exterior of the structure.

During the assembly of the structure, it is a simple matter to insert the pedal bar 39 by sliding the same through the slots 43 and 41 in the outer shell 5 and the support bar 8, being careful to register the lug 45 with the slot enlargements 44 and 42 in the manner indicated in Figure 5, the stepped end 38 of the bar being inserted through the thrust bar slot 37 as indicated in Figures 1 and 4 and the lug finally snapping behind the support bar 8 and securing the assembly as shown in Figure 1. The bar 39 may also be removed by moving the same endwise slightly and springing the offset bar end to release the stepped end 38 and then by again bringing the lug 45 into registry with the slot enlargements 42 and 44 the bar may be readily withdrawn through the slots 41 and 43. It is to be understood that the support bar 8 is resilient and can be sprung slightly, when necessary, to facilitate the removal of the stepped end 38 from the thrust bar offset 36.

While one form of the invention has been shown for purposes of illustration it is to be clearly understood that various changes in the details of construction and arrangement of parts may be made without departing from the spirit and scope of the invention as defined in the appended claims.

I claim:

1. A receptacle of the character described comprising a cylindrical outer shell, a cover hingedly mounted on the shell, a cylindrical inner container supported in spaced relation within the shell and readily removable when the cover is lifted on its hinge mounting, and pedal operable means for lifting the cover and including a thrust bar connected with the hinge means and disposed uprightly in the space between the inner container and the outer shell, and a flat pedal bar disposed generally horizontally and with its flat body upright, said bar being connected at one end to the lower end of the thrust bar and having its other end extended through an upright slot in the shell and equipped with a foot engageable pedal, there also being included a support bar traversing the bottom of the shell and connected at its ends thereto and forming at least in part the means for supporting the inner container, said support bar having an upright slot therein wherein the pedal bar rests as a fulcrum, and said pedal bar end connection comprising free projection of the pedal bar end into an upright slot spaced slightly above the lower end extremity of the thrust bar, and means on said pedal bar cooperating with the slot of the support bar for securing the pedal bar against free sliding movement outwardly of the shell slot through the other slots.

2. A receptacle of the character described comprising a cylindrical outer shell, a cover hingedly mounted on the shell, a cylindrical inner container supported in spaced relation within the shell and readily removable when the cover is lifted on its hinge mounting, and pedal operable means for lifting the cover and including a thrust bar connected with the hinge means and disposed uprightly in the space between the inner container and the outer shell, and a generally horizontally disposed pedal bar connected at one end to the lower end of the thrust bar and having its other end extended through an upright slot in the shell and equipped with a foot engageable pedal, there also being included a support bar traversing the bottom of the shell and connected at its ends thereto and forming at least in part the means for supporting the inner container, said support bar having an upright slot therein wherein the pedal bar rests as a fulcrum, and said pedal bar end connection comprising free projection of the pedal bar end into an upright slot in the lower end of the thrust bar, and there being included means for securing the pedal bar against free sliding movement outwardly of the shell slot through the other slots, said last named means comprising a lug struck out from the pedal bar and engaging behind the support bar.

3. A receptacle of the character described comprising a cylindrical outer shell, a cover hingedly mounted on the shell, a cylindrical inner container supported in spaced relation within the shell and readily removable when the cover is lifted on its hinge mounting, and pedal operable means for lifting the cover and including a thrust bar connected with the hinge means and disposed uprightly in the space between the inner container and the outer shell, and a generally horizontally disposed pedal bar connected at one end to the lower end of the thrust bar and having its other end extended through an upright slot in the shell and equipped with a foot engageable pedal, there also being included a support bar traversing the bottom of the shell and connected at its ends thereto and forming at least in part the means for supporting the inner container, said support bar having an upright slot therein wherein the pedal bar rests as a fulcrum, and said pedal bar end connection comprising free projection of the pedal bar end into an upright slot in the lower end of the thrust bar, and there being included means for securing the pedal bar against free sliding movement outwardly of the shell slot through the other slots, said last named means comprising a lug struck out from the pedal bar and engaging behind the support bar, and said support bar and shell slots having lateral enlargements through which said lug can be withdrawn after being moved into registry therewith.

4. A receptacle of the character described comprising a cylindrical outer shell, a cover hingedly mounted on the shell, a cylindrical inner container supported in spaced relation within the shell and readily removable when the cover is lifted on its hinge mounting, and pedal operable means for lifting the cover and including a thrust bar connected with the hinge means and disposed uprightly in the space between the inner container and the outer shell, said thrust bar having a longitudinal reinforcing rib extending throughout the major portion thereof and an inwardly offset portion at the lower end thereof, and a pedal bar connected at one end to the offset portion of the thrust bar and having its other end extended through an upright slot in the shell and equipped with a foot engageable pedal, said inner container extending upwardly within the outer shell to place its upper end extremity above the level of said hinge means, said outer shell having an opening therein opposite the hinge mounting and the hinge means including a first member secured to the shell about said opening and a second member secured to the cover and having a crank portion extending into said opening and having pivotal connection with the upper end of the thrust bar, said second member having a body portion disposed over and concealing said shell opening.

5. A receptacle of the character described comprising a cylindrical outer shell, a cover hingedly mounted on the shell, a cylindrical inner container supported in spaced relation within the shell and readily removable when the cover is lifted on its hinge mounting, and pedal operable means for lifting the cover and including a thrust bar connected with the hinge means and disposed uprightly in the space between the inner container and the outer shell, said thrust bar having a longitudinal reinforcing rib extending throughout the major portion thereof and an inwardly offset slotted portion at the lower end thereof, and a generally horizontally disposed pedal bar connected at one end to the slotted lower end of the thrust bar and having its other end extended through an upright slot in the shell and equipped with a foot engageable pedal, there also being included a support bar traversing the bottom of the shell and connected at its ends thereto and forming at least in part the means for supporting the inner container, said support bar also providing a fulcrum support intermediately of the ends of the pedal bar, said inner container having a bottom seam-secured thereon so that the bottom closure is recessed upwardly from the bottom extremity of the inner container, and said support bar having end clearances in which to receive the bottom seam so that the top edge of the support bar directly engages the bottom closure.

References Cited in the file of this patent

UNITED STATES PATENTS

| | | |
|---|---|---|
| 1,714,332 | Ullrich | May 21, 1929 |
| 1,837,221 | Kamenstein | Dec. 22, 1931 |
| 1,966,323 | Von Elm | July 10, 1934 |
| 2,001,445 | Abele | May 14, 1935 |
| 2,271,918 | Glowka | Feb. 3, 1942 |

FOREIGN PATENTS

| | | |
|---|---|---|
| 272,135 | Great Britain | June 9, 1927 |
| 466,260 | Great Britain | May 25, 1937 |
| 618,756 | Great Britain | Feb. 25, 1949 |
| 1,080,631 | France | June 2, 1954 |